June 22, 1954  A. C. RUGE  2,681,566
NEGATIVE SPRING SENSITIZING MEANS
Filed April 17, 1948  3 Sheets-Sheet 1

INVENTOR
ARTHUR C. RUGE
BY
ATTORNEY

June 22, 1954  A. C. RUGE  2,681,566
NEGATIVE SPRING SENSITIZING MEANS
Filed April 17, 1948  3 Sheets-Sheet 2

INVENTOR
ARTHUR C. RUGE
BY
ATTORNEY

June 22, 1954  A. C. RUGE  2,681,566
NEGATIVE SPRING SENSITIZING MEANS
Filed April 17, 1948  3 Sheets-Sheet 3

INVENTOR
ARTHUR C. RUGE
BY
ATTORNEY

Patented June 22, 1954

2,681,566

UNITED STATES PATENT OFFICE 2,681,566

NEGATIVE SPRING SENSITIZING MEANS

Arthur C. Ruge, Cambridge, Mass., assignor to Baldwin-Lima-Hamilton Corporation, a corporation of Pennsylvania Application April 17, 1948, Serial No. 21,714

10 Claims. (Cl. 73—141)

This invention relates generally to continuously condition-responsive apparatus and more particularly to improved means for increasing the condition sensitivity of the responsive element of such apparatus which may be used in various applications involving either measurement of or response to continuously applied force or displacement.

An object of my invention is to provide an improved continuously condition-responsive apparatus that has a high degree of sensitivity in response to small actuating forces and is of such a nature that its practical embodiments may be designed on the basis of relatively simple and direct theoretical considerations with a high degree of certainty as to the relation of its sensitivity to the actuating force.

A further object is to provide an improved continuously condition-responsive apparatus of the foregoing type that has a high degree of ruggedness combined with convenience in application to many situations.

In accomplishing the foregoing and other objects of my invention I reduce the "effective stiffness" of a primary responsive element by combining with it what I refer to as "negative spring" action. The principle may be used wherever it is desired to produce for conditionresponsive purposes a given strain in an elastic or quasi-elastic member or structure by the application to it of a force which would normally be insufficient to produce such given strain. The principle is broadly applicable to any kind of elastic or quasi-elastic member or structure which is used as a strain responsive means, whether the member or structure acts in direct stress, bending, torsion, or a combination of any of them.

Other objects and advantages will be more apparent to those skilled in the art from the following description of the accompanying diagrammatic drawings in which.

Figure 1:
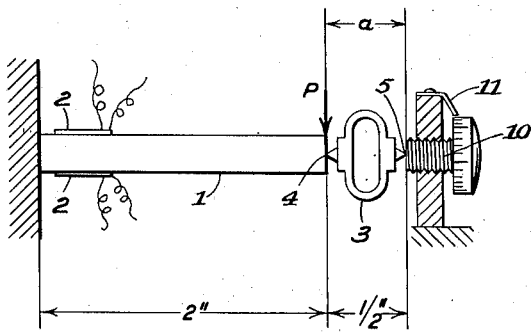
Figs. 1 to 8 illustrate the principles of my invention as applied to cantilever beams of strain responsive elements.

As a very simple example of the kind of problem in which this invention has particular value, it is only necessary to consider a weighing device which comprises a simple cantilever such as 1, Fig. 1, with load P applied at its end and which employs means responsive to the bending of the cantilever to measure the load. If there are no limits as to the size, length, and deflection of the cantilever then theoretically at least a suitable design can be made which will give a desired amount of bending for any conceivable load. While there are many applications where a simple cantilever is perfectly satisfactory for this purpose, such as the bending beams of Patent No. 2,316,203, it frequently happens that difficulties are encountered because the size, length, or deflection, or a combination of these, makes the design impractical or entirely unacceptable. Suppose, for example, it is desired to weigh a load of five ounces, using a steel cantilever equipped with bonded wire strain gages as the responsive means, with the practical limitations that the cantilever must be one-half inch wide by two inches long, and that the fiber strain at its root due to bending must be 700 microinches per inch. Such conditions would be convenient and practical from the standpoint of gage application and design of associated instrumentation. These conditions can be met without difficulty, as is well known. But suppose that there is the additional limitation that the deflection at the loaded end of the cantilever must not exceed $\frac{1}{100}$ inch. A simple calculation soon shows that this condition cannot be met simultaneously with the other conditions. It is found that using the former conditions the cantilever would have to be .019 inch thick, and the deflection under a five ounce load would be $\frac{1}{10}$ inch, or ten times the latter stated deflection condition. If, instead, the cantilever is designed to satisfy only the width, length, fiber strain, and deflection conditions, it is found that a load of thirty ounces would be required to produce the specified strain. That is, the cantilever would have to be six times too stiff.

Continuing with this same example, I show in Fig. 1 an embodiment of my invention which makes it possible to satisfy all of the above enumerated conditions. As stated above, if the cantilever is designed to satisfy the requirements as to width, length, fiber strain, and deflection, it turns out that a load of 30 ounces would be required to produce the required fiber strain at the root of the cantilever. The cross-section of the cantilever turns out to be 0.186 deep by ½" wide. It will be seen that if I am to satisfy all of the conditions I must in some way reduce the "effective stiffness" of the cantilever so that an applied load of five ounces will produce the required strain. In Fig. 1 I show the cantilever 1 to which are bonded strain gages 2 so as to be responsive to the bending of the yieldable element or member 1. In order to reduce the effective stiffness of member 1 I provide a force-producing device 3, specifically shown in this particular embodiment as a preloaded spring element, and means whereby such device may exert a force on the yieldable member so that such force acting on the yieldable element 1 varies with the yielding thereof and assists the applied force P in causing the yieldable element to yield an amount greater than it would yield under the influence of the applied load alone. This means for causing such force variation is shown, in the Fig. 1 form, as consisting of supporting the force-producing device at one end by a knife edge or point 4 bearing against member 1 and at its other end by a knife edge 5 bearing against a stationary member 10. If member 1 is now deflected in either direction in the plane of the paper, it may be seen that the preload of spring 3 acts in such a way as to urge member 1 to deflect still further; in other words, spring 3 acts to reduce the effective stiffness of member 1 against bending. Such an effect I call a "negative spring action," although, of course, there is no such thing as a true negative spring. The effectiveness of my invention is shown by assuming, by way of example, that the overall preloaded length of member 3 is one-half inch. A simple calculation shows that if I preload member 3 to the extent of 78 pounds I will have achieved the purpose of reducing the effective stiffness to the point where a five ounce applied load P will produce a deflection of 1/100 inch at the point of load application, causing a root strain of 700 microinches per inch. That this is so may be seen easily as follows: when the end of cantilever 1 is deflected 1/100" the line of action of the 78 pounds (1250 ounces) preload assumes a downward slope of 1 in 50. This produces a vertical component of load acting on the end of cantilever 1 equal to 1/50 of 1250 ounces or 25 ounces. The five ounce applied load added to the 25 ounces produced by member 3 just makes up the 30 ounces required to deflect member 1 a distance of 1/100". The numerical dimensions shown in Fig. 1 apply to the specific example just discussed and play no part in the broad principle illustrated in that figure.

I have in Fig. 1 shown one of the simplest modifications my invention can assume. In this, and in most of the subsequent modifications, I have illustrated my invention as applied to cantilever beams to facilitate understanding of the principles of the invention when so applied. However, it will readily be seen, from other embodiments hereof that the broad concept may be applied to a very wide variety of structures. In order to visualize the broad aspects of the invention it is only necessary to consider that point 4 represents any point on a structure, the deflection of point 4 being the result of application of load to the structure, and that member 3 represents any device or means which is actuated by the deflection of point 4 in such a way as to urge that point to move still farther in the same direction than it would have moved under the influence of the applied load alone. It therefore makes no difference whether member 1 happens to act in bending, direct stress, torsion, or a combination.

Figure 2:
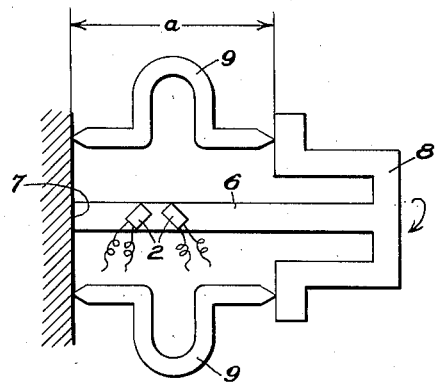

While it would be repetitious to illustrate a wide variety of applications of my invention, I show in Fig. 2 one of many ways in which it may be applied to reduce the effective stiffness of a member 6 which acts in torsion. Member 6 is attached at one end 7 to a rigid support and at the other end to a plate 8. Bearing against the rigid support and plate 8 are two or more members 9 which terminate in points or knife edges or elastic hinges and which are preloaded to a desired extent by making their free length greater than that shown and employing the spring action of the curved section of the members. Member 9 is therefore merely a variation on member 3 of Fig. 1. It will be seen that if torque is applied at plate 8 tending to twist member 6, then members 9 will assume an inclined position in such a direction as to urge member 6 to twist still farther. It will therefore be seen that there is no difference in principle between Fig. 2 and Fig. 1. Once the basic principle is understood it is a relatively simple matter to apply it to any case coming within the broad scope of my invention as given above, whether the member acts in direct stress, bending, torsion, or a combination of them.

While I have thus far referred to the member or structure as an elastic one, it is by no means necessary that true elasticity is a requirement for the successful application of the invention. It is, of course, necessary that the member or structure be truly elastic if it is to be used as a force or load measuring device; otherwise, the lack of elasticity would result in errors which have nothing to do with the principle of my present invention.

There are other applications where lack of true elastic action is of little or no importance. For example, suppose in Fig. 1 that my only requirement is to measure the deflection at point 4 without regard to the magnitude of the load producing the deflection. In such a case it would not make any difference whether member 1 and/or member 3 were made of truly elastic material. The only requirement would be that the strain at strain gages 2 is directly interpretable in terms of the deflection of point 4. A practical example might be as follows: instead of making member 1 out of steel, as assumed above, let it be made out of Celluloid or similar plastic material. While it is well known that such a material is not truly elastic and that it has a strong tendency to creep under sustained load, I have shown by actual tests that it is perfectly well suited to the measurement of deflection when applied in a system such as that shown in Fig. 1. I have found that if I apply a given deflection at point 4 and measure the resulting strain at gage 2 there is a precise relationship between the strain and the deflection, and that this relationship is not influenced by the creep properties of the material. Using Celluloid, I have made measurements of this sort for long periods of time (several hours) without detecting any error as a result of creep. Another excellent material for this purpose is Bakelite which is considerably more elastic than Celluloid—in fact, for some applications Bakelite may be used for measurement of weight or force so long as relatively short periods of time are involved. The advantage of using such a material as Celluloid or Bakelite lies in the fact that the modulus of elasticity of such materials is a great deal lower than that of metals such as steel, dural, etc., and therefore much smaller forces are required to produce given strains.

Continuing with Fig. 1 as a simple example to show the relative advantages of the use of a low modulus material, suppose it is desired to measure only the $\frac{1}{100}''$ deflection at point 4 and suppose the cantilever shown in Fig. 1 is made of clear Bakelite instead of steel. The modulus of elasticity of clear Bakelite is approximately $\frac{1}{50}$ that of steel. Therefore the actuating force required to produce $\frac{1}{100}''$ deflection at point 4 will be only $\frac{1}{10}$ ounce, assuming that the preload in member 3 is reduced by the factor $\frac{1}{50}$ to 25 ounces. By increasing the preload of member 3 to approximately 30 ounces the effective stiffness of the system is reduced to substantially zero.

Thus it may be seen that I have provided deflection and force measuring means which can be made to have arbitrarily small effective stiffness while at the same time being made of rugged and foolproof construction that belies the remarkable delicacy of response. It is to be especially noted that if provision is made for moving point 5 in Fig. 1 as by screw 10 so as to vary the preload (or analogously to vary the distance between plate 8 and support 7 in Fig. 2), then I can adjustably predetermine the sensitivity to load. Thus, in a weighing device I can provide a very wide range of measurements by making a simple mechanical adjustment which can be read off from a pointer 11 on a graduated scale as indicated in Fig. 1.

It should also be noted that I can reverse the effect so as to increase the effective stiffness, and in some instances I may wish to do so in order to further increase the range of measurement. In Fig. 1 for example, member 3 can produce a preload force pulling at point 4, instead of pushing there as shown, merely by considering that points 4 and 5 diagrammatically illustrate pulling type pivotal connections.

Figure 3:
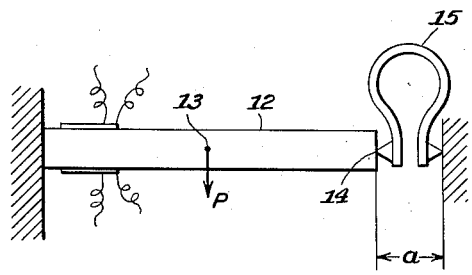

The effectiveness of the design shown in Fig. 1 can be further improved by means of the variation illustrated in Fig. 3. Here, bending member 12 is extended beyond load point 13 to some point 14 before engaging preloaded member 15 which produces the negative spring effect. The advantage of this arrangement is that point 14 moves a greater distance than point 13, giving member 15 a greater advantage than has member 3 in Fig. 1. It will be seen of course that various arrangements of lever systems can be used to this same purpose within the scope of my invention.

Figure 4:
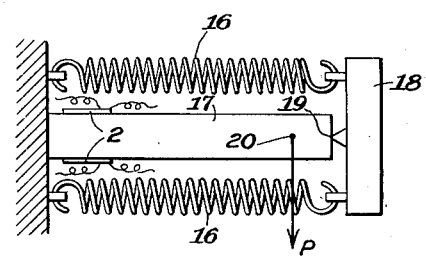

Fig. 4 shows another embodiment of the same principles as Fig. 1 in which tension springs 16 produce a negative spring action on a cantilever 17. The tension springs are preloaded, the preload being carried to cantilever 17 through member 18 contacting the cantilever at point 19. The greater the length of springs 16 relative to the length of member 17 the more effective they are in producing the desired negative spring action. Strain responsive electrical impedance devices 2 respond to a load P applied at point 20.

Referring to Figs. 1, 2 and 3 it may be seen that the magnitude of distance $a$ is just as important as the magnitude of the preload which acts to produce the negative spring action. The smaller distance $a$ is, the smaller will have to be the preload; therefore it is clear that there are advantages from the standpoint of practical design in keeping distance $a$ as small as possible. Thus, a spring element such as 15 in Fig. 3 is sometimes of advantage.

Figure 5:
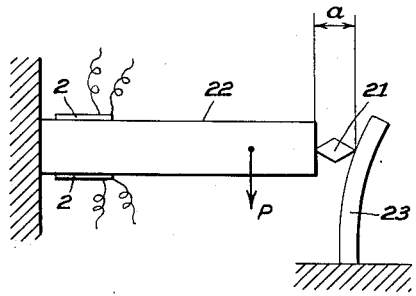
Figure 6:
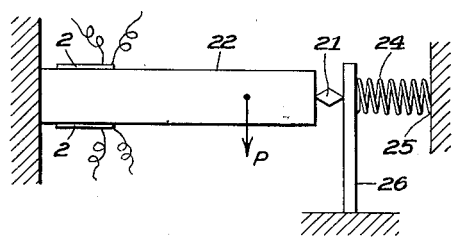

Fig. 5 shows an embodiment which carries this idea still further. A lozenge 21 bears between cantilever 22 which is responsive to load P and a flexible member 23 which transmits a force through lozenge 21 to the end of cantilever 22 thereby achieving exactly the same effect as that given by preloaded compression member 3 in Fig. 1. But here, the distance $a$ can be made almost arbitrarily small so that the effects of the preload force generated by spring member 23 is greatly magnified. An alternative arrangement for producing the desired force on lozenge 21 is shown in Fig. 6 where a preloaded compression spring 24 supported at 25 urges member 26 against the lozenge. Member 26 can be a flexible member as shown or a simple hinged member. In fact, it will readily be seen by those skilled in the art that the possible variations in the details of the application of this invention are almost limitless. The examples presented herein are sufficient to suggest the scope of the matter but they are by no means intended to be all inclusive.

Figure 7:
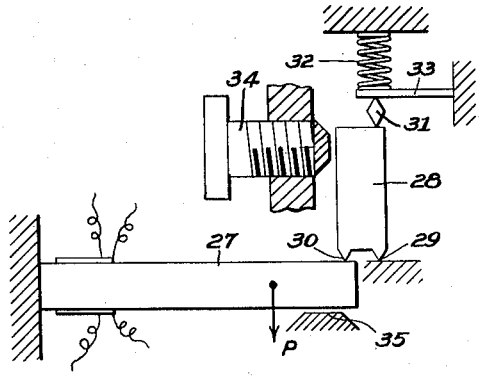

Fig. 7 shows one of many arrangements in which a leverage is used to enhance the action of the "negative spring" action. Again for simplicity the responsive element is shown as a cantilever 27 equipped with strain gages 2 so as to respond to load P. A lever 28 engages a fixed support at knife edge 29 and engages member 27 at knife edge 30 so that the application of load P causes lever 28 to rotate about point 29. Vertically above point 29 is shown lozenge 31 which is acted upon by members 32 and 33 corresponding to members 24 and 26 of Fig. 6. In place of lozenge 31, etc., I could, of course, use member 3 of Fig. 1, member 15 of Fig. 3, etc., for the same purpose. Overtravel stop 34 may be provided if desired. Knife edges 29 and 30 may be replaced by Cardan hinges or by simple flat spring hinges thereby increasing the ruggedness of the device. It is believed that this one example will suffice to suggest the almost limitless number of lever and linkage systems which can be employed within the scope of my invention. It will be seen that in Fig. 7 when member 28 engages stop 34 load responsive cantilever 27 then assumes its normal stiffness. Stop 34 can of course be made adjustable in position by having a manually rotatable threaded stem so that it comes into action at any desired point. The arrangement therefore has the advantage of providing a very wide range of load measurement in a single responsive pickup. Adjustment of the preload in spring 32 also provides means for varying the range of measurement. Suppose the cantilever (or other responsive element) has a normal capacity of 100 pounds when used by itself and that the "negative spring" apparatus is designed to give the combination a rated capacity from 10 pounds down to one pound by adjusting the preload on spring 32. It will be seen that the deflection of the cantilever 27 at capacity loading will be the same regardless of the range the device is set for. Therefore it can serve to measure loads P over a 100 to 1 range without requiring any change in the strain responsive apparatus associated with strain gages 2. And if the strain responsive apparatus is also adjusted in sensitivity it will be seen that the range of measurement can be extended still further. When working on the lower ranges safety stop 34 will protect the system from accidental overloads even up to the safe load of the responsive element 27 which may itself have a safety overload stop 35. If it is desired to measure only in the 100 pound range in the example given above one has merely to move stop 34 over against member 28 so as to put the negative spring device out of action. The principle illustrated in Fig. 7 is useful in devices such as multi-load-range testing machines, etc.

Figure 8:
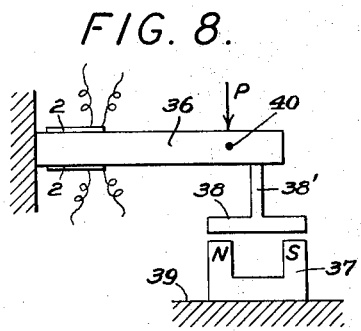

Another application of the principle of this invention employs a magnetic type of force-producing device so as to offset or partially offset the stiffness of the responsive element 36 which is equipped with strain sensitive elements 2 so as to be responsive to a load P. This type of device is specifically shown in Fig. 8 as a permanent magnet 37 mounted on a fixed support 39 and armature 38, while means 38' are provided whereby the armature of this device exerts on responsive element 36 a force varying with the yielding thereof so that said force assists the applied load P in causing said element to yield an amount greater than it would yield under the influence of the applied load alone. Magnet 37 is supported at point 39 to a fixed support. It will be seen that as a load P is increasingly applied to member 36 the air gap between piece 38 and magnet 37 will be continuously reduced, thereby causing a greater attraction between these two pieces than existed before load P was applied. The effect of the magnetic circuit, therefore, is to urge member 36 to deflect farther than it would have deflected if the magnetic circuit were not present. Conversely, if load P is applied upward the air gap is increased and the attraction between 37 and 38 is reduced which again causes member 36 to deflect more under the influence of load P than it would have deflected had the magnetic circuit been absent. Fig. 8 is therefore merely an example of the employment of another but equivalent means to achieve the same end; i. e., the reduction of the effective stiffness of the responsive member so that it is continuously condition responsive.

By proper adjustment of the air gap of Fig. 8 and by well-known methods of shaping the pole pieces, the negative stiffness of the magnetic circuit can be made equal to, or more or less than, that of the responsive element which is here shown as a cantilever for the purpose of simplifying the figure. The arrangement of air gap and magnetic circuit shown in Fig. 8 would of course be non-linear, but for small motions the linearity would be sufficient for most practical purposes. Appropriate shaping of the pole pieces will result in improved linearity, as is well known. It is also possible to employ a solenoid for the same purpose as explained later, and it is a relatively simple matter to achieve good linearity with a properly designed solenoid.

A remarkable feature of this system is that the overall sensitivity to load can be adjusted at will over a very wide range by merely adjusting the air gap. While adjustable sensitivity is a feature of the mechanical arrangements described above, the magnetic system allows the purpose to be accomplished with great ease since only a simple air gap adjustment is involved. If such an arrangement as that shown in Fig. 8 is used for the purpose of measuring deflection at point 40 without regard to magnitude of load P then such non-linearity as may exist in the magnetic circuit is not at all critical and it is merely a case of adjusting the air gap until the desired operating condition is obtained. Thus, suppose member 36 is the sensing element of a gaging or measuring device such as a caliper. The magnetic arrangement is ideal from the standpoint of ruggedness, simplicity and adjustability.

Figure 9:
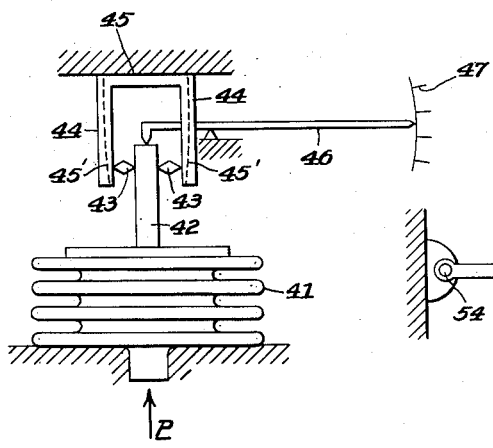
Fig. 9 shows such principles applied to a fluid pressure gage.

As a further illustration of the broad usefulness of my invention applied to strain responsive apparatus, I show in Fig. 9 a Sylphon bellows which is used to measure a fluid pressure $p$. One of the difficulties in measuring low pressures with Sylphon bellows results from the fact that the bellows normally used for low pressure work are relatively weak and delicate and such bellows are normally not perfectly elastic, showing a marked degree of non-linearity or hysteresis. My invention makes it possible to employ a much more rugged bellows 41 than would normally be used since I reduce the effective stiffness of the bellows by means of my negative spring action. A member 42 is engaged by lozenges 43 which are urged against it by spring members 44 connected to support 45, it being understood that the spring members in their free state are curved inwardly along dotted lines 45'. The action here is the same as that shown in Fig. 6. A multiplying lever 46 of any convenient type indicates on scale 47 the motion of member 42 as a result of pressure $p$. Such a device has the advantage of improved elastic action because of the stiffer bellows employed. In addition, it has the advantage of providing a more rugged instrument which will withstand severe service and yet sensitively indicate low pressures which would otherwise require a relatively delicate instrument.

Figure 10:
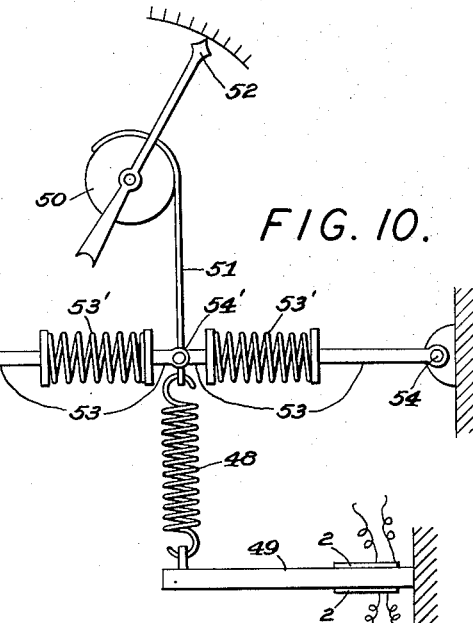
Fig. 10 shows such principles applied to a manual or automatic null balancing instrument.

In Fig. 10 hereof I show a spring member 48 in conjunction with a strain responsive member 49 on which are mounted strain gages 2. A drum 50, rotatably driven in any desired manner, carries a flexible belt or strap 51 which actuates one end of spring 48 that is connected to strain sensitive beam element 49. A pointer 52 serves to indicate the magnitude of a signal generated by the gages 2 on the strain sensitive member 49. Since strap 51 is unable to carry compression, spring 48 will always be in tension. Therefore, no matter what position pointer 52 assumes, there will be a tension against strap 51 and consequently the driving means for drum 50 whether manual or automatic will have to always supply a torque to drum 50 to maintain a balanced condition. In the case of manual balancing this is not objectionable since drum 50 can be held in position by any well-known locking devices when it is desired to maintain a given setting without manual aid. When drum 50 is driven by a servo mechanism, however, it would be desirable to have a minimum tension acting in strap 51 since any force there will produce an error in the indication, and this error will vary with the indicator position (since the magnitude of the force varies with the indicator position). Furthermore, the error due to force acting in strap 51 will also vary with any variations which may take place in the sensitivity or "gain" of the driving system which tries to maintain the null position. This latter objection is the more serious since any fixed error can always be calibrated out, but if the error varies with sensitivity (as might happen when the line voltage on an amplifier changes) then the magnitude of the error at any given time can never be known.

The embodiment of my present invention as shown in Fig. 10 overcomes the above difficulty in an effective and simple manner. I employ preferably a pair of force-producing devices consisting of preloaded compression members 53 having self-contained preloading springs 53'. Means for connecting these devices to the strain sensitive element to perform the "negative spring" function consists of a pair of fixed pivots 54 at one end of the devices and a movable pivot 54' at the other end, to which is attached strap 51 and the upper end of spring 48. Preferably, spring 48 is a tension spring which is so adjusted that it remains in tension throughout the entire travel of pointer 52. Let us suppose that in the position shown, pointer 52 is at the extreme clockwise limit of its travel, at which position members 53 are at right angles to strap 51 and the tension in spring 48 is small or substantially zero. If pointer 52 is now driven counterclockwise in order to produce a balancing signal by means of strain responsive member 49, spring 48 will be stretched thereby producing a downward force at point 54'. Members 53 will acquire inclined positions such that the preload in them will urge point 54' upward in opposition to the downward force of spring 48. Preferably, the preload in members 53 will be such that the force exerted by spring 48 will always slightly exceed the counteracting reaction produced by the inclination of members 53; otherwise, strap 51 would have to be replaced by a member which can also carry compression. It will thus be seen that I have here provided means to offset any desired fraction of the effective stiffness of spring 48 and member 49 combined so that the actuating means 50 can be operated with extremely small amount of power while still producing relatively large forces on member 49.

If strap 51 is replaced by a member which can take tension and compression, such as a rack actuated by a pinion in place of drum 50, then it may be seen that spring 48 can act in either tension or compression or both. In such a case, it does not matter if the preload in members 53 is so great as to overcompensate for the effective stiffness of the responsive means.

Instead of using two members 53 as shown in Fig. 10, one of the members can be replaced by a simple rod hinged at 54 and 54', or some other means such as rollers for taking up the horizontal component of the reaction produced by single member 53.

Still referring to Fig. 10, it may be pointed out that the same kind of action may be obtained in another way. If members 53 are eliminated entirely and if member 49 is provided with negative spring compensation as indicated in Fig. 1 or 5 for example, then spring 48 may be replaced by a very weak spring since only a small force would be required to produce the necessary strain in member 49. The net result would therefore be that only a very small torque is required to actuate drum 50. The only limitation of this arrangement is that spring 48 should not become so flimsy or delicate as to make the instrument unsuited for practical use.

While I have in the above description generally referred to the negative spring action as being smaller than the positive spring action of the responsive element, it should be noted that this is not necessarily a limitation. In the case of a force measuring device as illustrated in Fig. 1, it is of course necessary that the combined system be stable; that is, it must still present a positive stiffness against an applied load. If, on the other hand, a device employing the principle of this invention is to be used only to measure a motion or a deflection, then it may be seen that it is immaterial whether or not the negative spring device overcompensates for the stiffness of the responsive element. Again, in the case of the instrument shown schematically in Fig. 10, if strap 51 is replaced by an actuating member, such as the previously mentioned rack and pinion, which is capable of sustaining both compression and tension loads, then it makes no difference whether or not members 53 overcompensate for the stiffness of spring 48 and member 49. In such a case, overcompensation merely means that the torque applied to drum 50 will be the reverse of that required for the condition of undercompensation.

Figure 11:
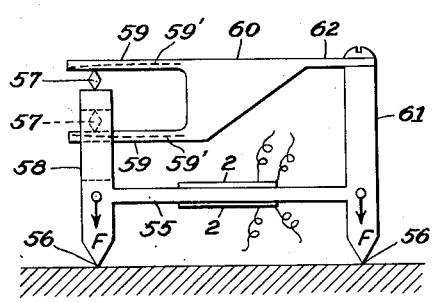
Figs. 11 and 12 show such principles applied to an extensometer.
Figure 12:
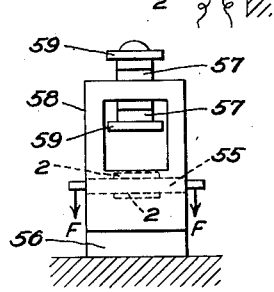

Figs. 11 and 12 show another embodiment of my invention and serve further to illustrate its broad usefulness when applied to force or motion responsive devices. I here show the application of my present invention to an extensometer which might, for example, be any of the designs shown in my Patents 2,316,975 or 2,416,664 or in my copending application, Serial No. 10,112 filed February 21, 1948. The object is, of course, to reduce the effective stiffness of the strain responsive means, here shown as a bending member 55 on which are applied bonded wire strain gages 2 which serve to measure the extent of bending of member 55 as a result of relative motion between knife edges 56. By reducing this effective stiffness I am able to employ smaller clamping forces F without danger of slipping of the knife edges 56. To accomplish this purpose I employ the same type of negative spring as shown in Fig. 9. Two lozenges 57 are supported against one end plate 58 in the manner shown. Force-producing devices comprising spring members 59 urge lozenges 57 against their support on member 58 and transmit angular motion to them when relative motion occurs between knife edges 56 by virtue of crossmember 60 which engages endpiece 61 through hinged plate 62. Spring members 59 are curved inwardly in their free state along lines 59' so as to provide the necessary spring action when in the assembled unit. Thus it may be seen that my present invention makes possible a marked improvement over such extensometers as are disclosed in my aforementioned patents, in that by virtue of the reduced effective stiffness of the responsive element I can produce greater strains in it without having to increase the clamping forces. As was pointed out in my said copending application, Serial No. 10,112 such a device is equally useful as a load or force measuring means where it is desired to minimize the deflection under load. The same structure is also well suited to calipering or gaging for size, as will readily be seen.

My present invention, as illustrated for example in any of the embodiments hereof, has another attribute which is sometimes of great value. Referring specifically to Fig. 1 as a very simple example, suppose it is desired to weigh a very small force which is superimposed upon a much larger force or weight so that it would normally be very difficult to measure the small force with high accuracy. If load responsive member 1 is designed strong enough to carry the total load or force it may be seen that I can accomplish the desired purpose as follows: With member 3 disengaged or removed as by backing off screw 10, let the larger force or load be applied to responsive member 1 and then bring member 3 back into position by rotating screw 10 inwardly so that the line joining its end points 4 and 5 is substantially perpendicular to the line of action of the force or weight which has already been applied to member 1. The line joining points 4 and 5 should be so located relative to the axis of member 1 that the preload force of member 3 causes substantially no further deflection of member 1. Application of the small superimposed load or force to be measured will now result in strains in gages 2 which are large enough to provide an accurate measurement of the small force. In other words, the presence of the large force or load in no way limits the accuracy to which the small superimposed force or load can be measured provided the negative spring is brought into action as described. The screw 10 serves to illustrate one form, among others, of a simple and convenient means for separating member 3 from member 1 at point 4 so that the operations described in this paragraph require very little time. It is to be noted that I have here provided a differential weighing device in which I not only weigh the differential load on the same member which carries the primary load but I can directly weigh both primary and differential loads on the same responsive device, such as strain gages 2 on member 1 in Fig. 1. This point was also brought out in the description of Fig. 7.

By arranging means for disengaging and reengaging lozenges 43 in Fig. 9, I can as just described employ this device for measuring small changes of pressure superimposed upon a large initial pressure. Suppose, for example, it is desired to use the device schematically shown in Fig. 9 as a pressure controller which is to be responsive to very small changes of the mean pressure. It will be seen that extraordinary delicacy of control can be obtained from this device which is inherently rugged and stable. Convenient means for disengaging and reengaging the negative spring means can be provided by employing the arrangement shown in Fig. 7 where stop 34 may be so adjusted that member 27 does not engage knife edge 30 until an upward force (the upward push of bellows 41, Fig. 9) reaches the magnitude at which control is to go into action.

Figure 13:
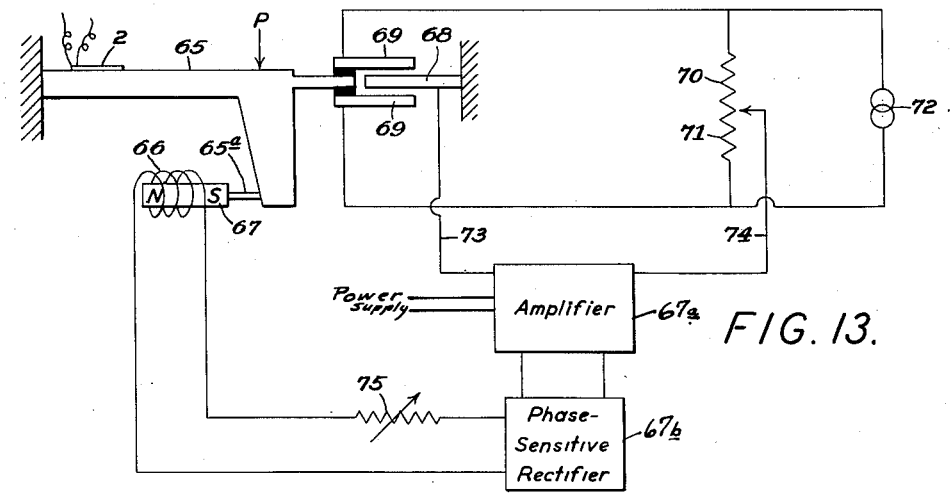
Fig. 13 illustrates an electronically actuated embodiment of my invention.

Fig. 13 illustrates a further embodiment of my present invention in which the negative spring action is brought about by a servo device employing an electronic amplifier. A member 65, shown for purposes of illustration as a bending beam, is the element adapted to yield in response to a load such as P applied thereto and a bonded wire strain gage 2 is attached to such member so as to be continuously responsive to the extent of its yielding. The force-producing means comprises a solenoid coil 66 and plunger 67 powered by an amplifier 67a through a phase-sensitive rectifier 67b. A movable plate condenser 68, 69 and the associated circuits and electronic equipment together with a connection 65a between the plunger 67 and member 65 comprise the means whereby the force-producing means is caused to exert on member 65 a force varying with the yielding thereof so that member 65 yields an amount greater than it would yield under the influence of the applied load alone. The three-plate condenser comprising a stationary plate 68 and two moving plates 69 which are attached to member 65 so as to move therewith, but which are insulated from each other, serves as the means to control the force produced by the solenoid 66, 67.

The variable plate condenser comprises two arms of a Wheatstone bridge, the other two arms being made up of resistive members 70 and 71 or other suitable impedance elements. The bridge is excited by an A. C. voltage applied at 72 and the unbalance of the bridge is carried to an electronic or other electrical amplifier by wires 73 and 74. The amplified unbalance is then carried to a phase-sensitive rectifier so as to produce a D. C. output which is responsive both in magnitude and direction to the relative movement between plates 69 and 68. Since plunger 67 of the solenoid is in the form of a permanent magnet having poles N and S, it may be seen that the solenoid may be made to push or pull on member 65. A variable resistance 75 may be used to regulate the amount of negative spring action transmitted by the solenoid.

It will readily be seen that many other arrangements may be used to perform the function illustrated in Fig. 13. For example, the motion pickup may be in the form of a photo-electric motion detector or a variable reluctance gage or any of the other well-known electrical motion pickups. The solenoid may be replaced by any electrical or mechanical means for producing the necessary force in response to the output of the amplifier. There are, in fact, so many practical variations, once the basic principle is understood, that anyone skilled in the art of servomechanism design can readily devise the variations in detail necessary to satisfy the requirements of any particular situation.

Figure 14:
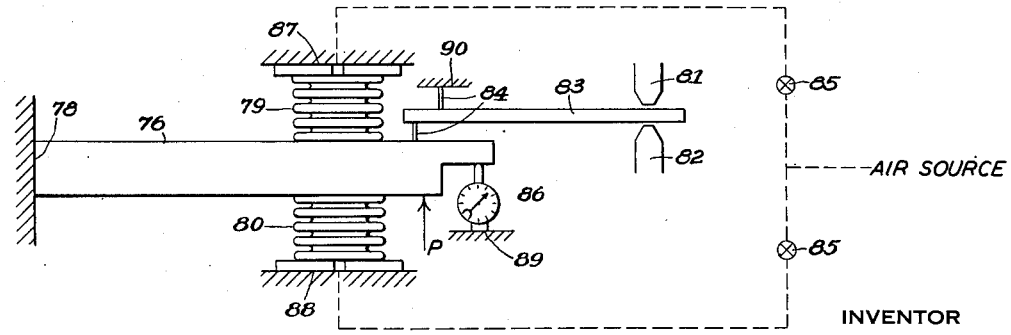
Fig. 14 illustrates a pneumatic actuated embodiment of my invention.

In order further to show the broad scope of my present invention, I show in Fig. 14 an illustration of the application of a pneumatic servo as a means of producing the negative spring action. Member 76, supported at 78, represents an element adapted to yield in response to a load applied at P. A dial gage 86 supported at 89 and actuated by the deflection of member 76 serves as a means responsive to the extent of yielding of 76.

In Fig. 14 the force-producing means connected to the yieldable element are air operated Sylphon bellows 79 and 80 supported at 87 and 88 at one end and bearing against 76 at the other, air pressure being supplied to the bellows from an air source and controlled in magnitude by throttles 85. A pair of orifices 81 and 82 controlled by a baffle 83 connected to the yieldable member 76 for movement therewith, controls the necessary force on member 76 whereby the force of the bellows varies with the yielding of member 76 and assists the load P applied to such member, thereby causing this to yield by a greater amount than it would under the influence of the applied load P alone. This action is controlled by the movement of baffle 83 in response to the deflection of member 76. Member 83 is in the form of a lever which is actuated through flexure plate fulcra 84 or other suitable means. One fulcrum is attached to member 76 and the other is fixed at point 90. Thus, any yielding of member 76 is magnified by the lever ratio of member 83 so as to control the escape of air from jets 81 and 82.

Suppose, for example, that with no external force applied to the system of Fig. 14 the pneumatic servo is so adjusted that the air pressure in bellows 79 and 80 is substantially the same and the system is in equilibrium. Now imagine a force P is applied upon member 76 as shown. The effect of force P is to deflect member 76 upward and, as a result, member 83 is caused to rotate in a clockwise direction. The restriction at air jet 82 is thereby increased while the restriction at jet 81 is decreased. The result is that the pressure in Sylphon 80 is built up while pressure in Sylphon 79 is decreased, thus producing a net force on member 76 which assists force P in causing member 76 to yield. Member 76 therefore yields an amount greater than it would yield under the influence of the applied load P alone. Many other examples could be drawn from an extensive art of pneumatic control, but the embodiment shown in Fig. 14 is sufficient to illustrate the broad principle.

Figure 15:
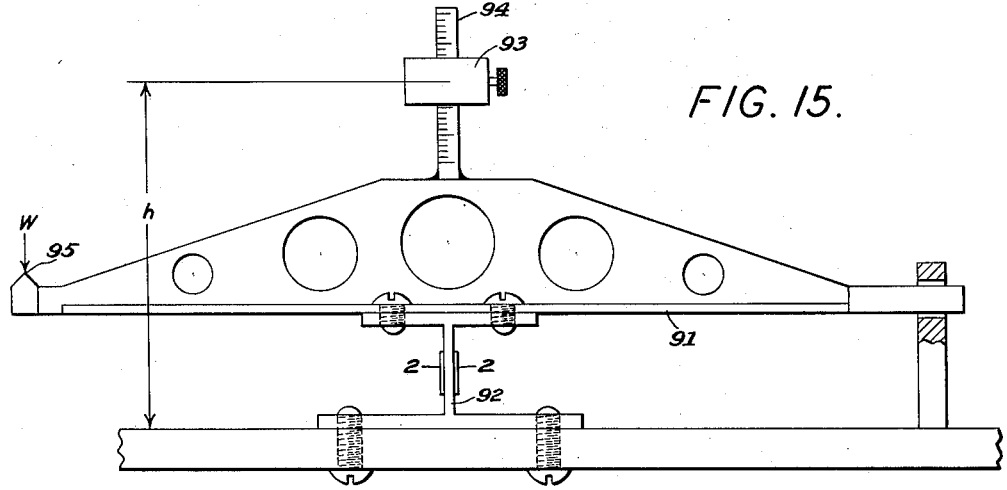
Fig. 15 illustrates a gravity actuated embodiment of my invention.

The means employed to vary the effective stiffness need not be in the nature of a preloaded elastic or quasi-elastic spring as shown in Figs. 1 etc. In Fig. 15 I show how simple gravity action can accomplish the same purpose. A beam 91 supported upon a flexure plate fulcrum 92, which constitutes an element adapted to yield in response to a load W applied to it at a point such as 95, has a force-producing device in the nature of a weight 93. The means whereby such force-producing device exerts a force on yieldable element 92 varying with the yielding of such element so as to assist the applied load W in causing element 92 to yield an amount greater than it would yield under the influence of force W alone comprises the connecting structure between the weight 93 and the yieldable flexure plate 92. This structure includes a vertical rod 94 upon which the weight is vertically adjustable as well as the intermediate portion of the beam 91. When a point such as 95 on the beam moves in one direction or the other as the result of load W being applied there, then the weight 93 is correspondingly moved off center of fulcrum 92 whereby the weight 93 exerts its force, in the nature of a moment varying with the yielding of member 92, to assist the load W as previously referred to. The strain gages 2 on the flexure plate fulcrum 92 constitute means, as in the other forms of my invention, continuously responsive to the extent of yielding of member 92.

It will of course be understood that various change in details of construction and arrangement of parts may be made by those skilled in the art without departing from the spirit of the invention as set forth in the appended claims.

I claim:

1. A condition responsive apparatus comprising, in combination, a supporting structure, a deflectable elastic cantilever beam having a substantially straight portion with a lengthwise axis initially in an undeflected position, said beam having one end fixed on said supporting structure and its other end free, said beam being deflected elastically relative to said supporting structure in response to an external load transmitted to the beam in a direction normal to its undeflected axis, force producing means and pivotal force direction changing means connected to each other in series and being interposed between and operatively connected to said beam and to another part of the stationary support, said direction means changing the direction of the force acting therethrough relative to said initial undeflected position of the beam axis in response to application of said external load thereby to produce a component of force normal to the initial undeflected axis of the beam, and means continuously responsive to the extent of deflection of said beam in the direction of said applied load.

2. The combination set forth in claim 1 further characterized in that the force producing means comprises a preloaded elastic member whose force varies with its elastic deformation.

3. The combination set forth in claim 1 further characterized in that the force producing means and direction changing means comprise an integral structure having two force transmitting pivots aligned in the direction of the transmitted force.

4. The combination set forth in claim 1 further characterized in that the pivotal force direction changing means comprises a link of fixed length pivoted at each end and interposed between the force producing means and the beam and adapted to transmit a compressive force from the force producing means to the beam substantially in the direction of its lengthwise axis.

5. The combination set forth in claim 1 further characterized by the provision of leverage means interposed between the force direction changing means and the beam whereby the action of the force producing means upon the beam is enhanced by the leverage means.

6. The combination set forth in claim 1 further characterized by the provision of means for rendering the force-producing means inoperative upon occurrence of a predetermined force applied to the cantilever beam, and means whereby the cantilever beam thereafter deflects a smaller amount for a given increase of force applied thereto than if said force-producing means were operative.

7. The combination set forth in claim 1 further characterized by the provision of means for causing said cantilever beam to be responsive to a load beyond that which is within the range covered by said force-producing means.

8. The combination set forth in claim 1 further characterized by the provision of means for relieving the action of the force-producing means whereby the cantilever beam may have a load applied thereto and thereafter said force-producing means may be reapplied to the beam, whereby the beam is effective for two load ranges.

9. The combination set forth in claim 1 further characterized by the provision of a driven element, and an extensible spring connecting said driven element with the cantilever beam, the force producing means comprising a preloaded compression spring device positioned substantially at right angles to the direction of movement of said driven element, the pivotal force direction changing means including means for pivotally connecting one end of said preloaded compression spring device to said driven element and including stationary means for pivotally supporting the other end of said spring device, the external load being applied to said driven element for driving the same, said extensible spring being subjected to the sum of said external load and said component of force, whereby said preloaded spring device assists in straining said cantilever beam so that the driven element may be driven by a smaller external load than if said preloaded spring device were absent, and the motion of said driven element in response to external load is substantially larger than the motion of the point of attachment of said extensible spring to said cantilever beam.

10. Condition-responsive apparatus comprising, in combination, a support, a cantilever beam fixed at one end to said support and its other end being free, said beam being adapted to deflect in response to a load applied normal to the lengthwise axis of the beam, a force-producing device directly engaging both the free end of said cantilever and another portion of said support to exert on the cantilever a force which is initially substantially lengthwise thereof so that the direction of said force varies with the deflection of the cantilever to produce a force component normal to the original undeflected lengthwise axis of said cantilever, thereby assisting said applied load in causing said cantilever to deflect an amount greater than it would deflect under the influence of the applied load alone, and means continuously responsive to the extent of deflection of said cantilever in the direction of the applied load.

References Cited in the file of this patent

UNITED STATES PATENTS

| Number | Name | Date |
|---|---|---|
| 310,471 | Springer et al. | Jan. 6, 1885 |
| 2,190,959 | Bornemisza | Feb. 20, 1940 |
| 2,279,261 | Crawford et al. | Apr. 7, 1942 |
| 2,307,917 | Clewell | Jan. 12, 1943 |
| 2,331,904 | Gustafsson et al. | Oct. 19, 1943 |